(12) United States Patent
Decker et al.

(10) Patent No.: US 7,384,694 B2
(45) Date of Patent: Jun. 10, 2008

(54) COATING COMPOSITION WITH FLOURESCENT COLORANTS HAVING COLOR EFFECT DEPENDENT ON LIGHT INTENSITY

(75) Inventors: Eldon L. Decker, Gibsonia, PA (US); Calum H. Munro, Wexford, PA (US); Robert E. Jennings, Ellwood City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/662,077

(22) Filed: Sep. 12, 2003

(65) Prior Publication Data

US 2005/0058826 A1    Mar. 17, 2005

(51) Int. Cl.
*B32B 5/16*    (2006.01)
*B32B 9/04*    (2006.01)

(52) U.S. Cl. ..................... 428/411.1; 428/323

(58) Field of Classification Search ........ 428/323–325, 428/327–330, 332, 340, 411.1, 913; 252/301.16, 252/301.33, 301.36, 501.1
See application file for complete search history.

(56) References Cited

U.S. PATENT DOCUMENTS

| | | | | |
|---|---|---|---|---|
| 4,472,479 A | * | 9/1984 | Hayes et al. | 428/32.74 |
| 4,702,574 A | * | 10/1987 | Bawa | 351/162 |
| 4,904,508 A | | 2/1990 | Madonia | 428/31 |
| 5,135,568 A | | 8/1992 | Fasano | 523/218 |
| 5,494,291 A | | 2/1996 | Kennedy | 473/378 |
| 5,762,698 A | | 6/1998 | Atkins et al. | 106/271 |
| 5,997,627 A | * | 12/1999 | Babler | 106/493 |

FOREIGN PATENT DOCUMENTS

| | | |
|---|---|---|
| DE | 3642621 | 6/1988 |
| EP | 0721976 | 8/1996 |
| GB | 1310481 | 3/1973 |
| JP | 04094774 | 3/1992 |
| JP | 06142608 | 5/1994 |
| WO | WO 03/024619 | 3/2003 |

* cited by examiner

*Primary Examiner*—Sheeba Ahmed

(57) ABSTRACT

A coating composition for applying to a substrate and containing a resinous binder with fluorescent colorants in an upper layer and light-absorbing particles in a lower layer. The coating composition exhibits a first color when exposed to light of a first intensity, the first color being dominated by absorbance of light by the colorants and the light-absorbing particles. When exposed to light of a higher intensity, the coating composition exhibits a second color dominated by fluorescent light emitted by the colorants.

10 Claims, 1 Drawing Sheet

COATING COMPOSITION WITH FLOURESCENT COLORANTS HAVING COLOR EFFECT DEPENDENT ON LIGHT INTENSITY

BACKGROUND OF THE INVENTION

1. Field of the Invention

The present invention relates to coating compositions containing fluorescent colorants, more particularly, to coatings containing fluorescent colorants that appear to change color with varying levels of light intensity.

2. Prior Art

Colored coating compositions typically include colorant particles dispersed in a resinous binder. The coating composition may further include reflective pigments, such as aluminum flake or metal oxide coated mica or other color effect pigment compositions or substrate-hiding materials, such as titanium dioxide. Conventional automotive solid-colored coatings include a resin and colored pigments which determine the desired coloration of the coating. Typically, solid color pigments are of a size such that they will scatter incident light effectively. The scattering will be in all directions.

Conventionally, in a pigmented coating composition, light that is scattered back out of the coating is described as being diffusely reflected while light that is scattered forward through the coating composition and is described as diffuse transmission. This scattering, in particular diffuse reflectance, is often desirable, providing opacity to the coating and hiding the surface of a coated article. Solid color pigments also typically absorb a portion of the incident light such that the light that is diffusely scattered and the remainder that is diffusely transmitted has a perceived color. These coating compositions may include a reflective pigment such as aluminum flake or metal oxide coated mica or other color effect pigment compositions. The portion of the incident light that is not absorbed or diffusely reflected by the colored pigment will interact with these color effect pigments. This portion of incident light may be specularly reflected by aluminum flake, or may interact with the coated mica or other effect pigment to produce a reflection whose perceived color is influenced by the structure of the pigment via an interference phenomenon. If this portion is specularly reflected by aluminum flake, there may be a perceived change in the color of the coating composition, typically described as flop. The perceived color will appear bright at viewing angles close to specular (on face), and appear to darken at viewing angles far from specular (on flop).

Such color effect pigments and coating compositions are desirable in the marketplace as styling tools in automotive coatings. However, angle-dependent color effect pigments are costly to prepare. The perception of color by the human eye is dependent on many factors, not the least of which is the environment surrounding a colored surface. One readily available environmental feature that affects the color of automotive coatings is the presence and intensity of sunlight. Some colors appear different in shade than when in direct sun. The advantages of producing color effects in coating compositions based on variable environmental light levels have not been fully exploited.

Accordingly, a need remains for producing cost-effective color effect coating compositions for use as alternative styling tools which use the surrounding light levels to control the perceived color of a coating composition.

SUMMARY OF THE INVENTION

This need is met by the fluorescent coating composition of the present invention which includes a resinous binder having fluorescent colorants dispersed therein. In use, a substrate is coated with a light-absorbing lower layer of a resinous binder and light-absorbing particles dispersed therein, and an upper layer of a resinous binder and colorants dispersed therein which emit fluorescent light when exposed to visible light fluorescent is applied onto the light-absorbing layer. When the coating composition exposed to a first light level, the coating composition exhibits a first colored appearance that is dominated by absorbance of light by both of the colorants and the light-absorbing particles. However, when the coating composition is exposed to a second light level, it exhibits a second colored appearance dominated by fluorescent light emitted by the colorants.

Under low intensity visible light, some portion of the colorants emits fluorescent light in all directions. However, the reflected light is dominated by the absorbance of light by the colorants and the light-absorbing particles, and no fluorescence is detectable by the human eye. In contrast, when the same coating composition is illuminated with higher intensity light, the fluorescence from the colorants dominates. The perceived color of the emitted fluorescent light is different from the color of the coating composition when fluorescence is not perceivable.

In this manner, the color of the coating composition applied to a substrate is dependent on the intensity of the light, such as by the time of day, season of the year, light levels (in shadow or in direct sun), and the like.

A complete understanding of the invention will be obtained from the following description when taken in connection with the accompanying drawing figures wherein like reference characters identify like parts throughout.

DETAILED DESCRIPTION OF THE PREFERRED EMBODIMENTS

Figure 1:
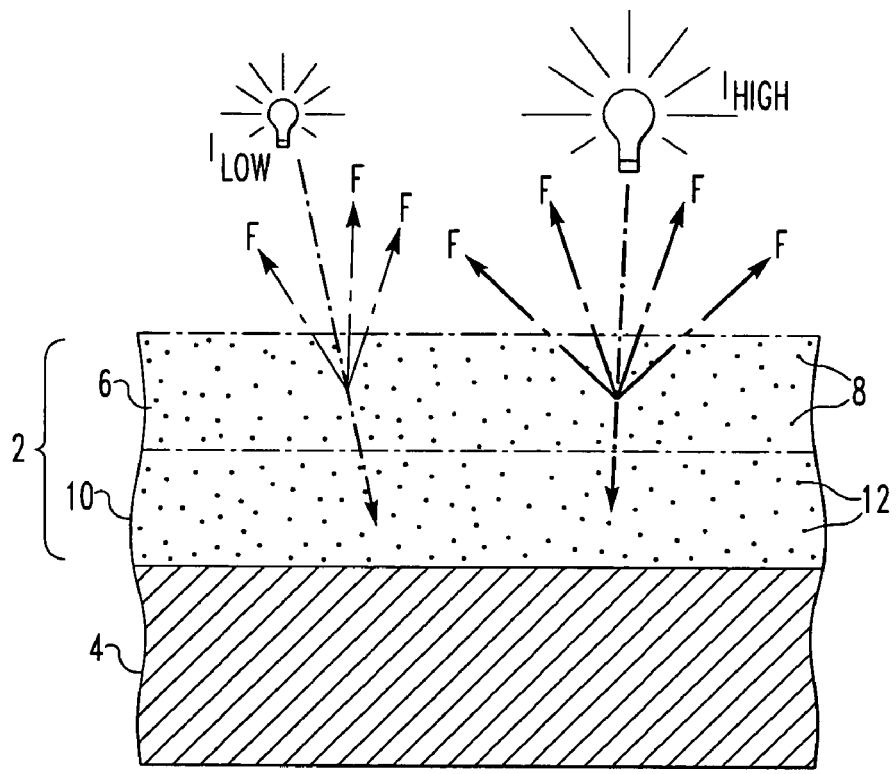
FIG. 1 is a cross-sectional view of one embodiment of a coated substrate of the present invention having colorants indicating the result of illumination of various levels of light.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Various numerical ranges are disclosed in this patent application. Because these ranges are continuous, they include every value between the minimum and maximum values. Unless expressly indicated otherwise, the various numerical ranges specified in this application are approximations.

The present invention is depicted in FIG. 1 as including a coating 2 applied to a substrate 4. The coating 2 includes a fluorescent layer 6 of fluorescent colorants 8 dispersed in a resinous binder and a light-absorbing layer 10 of light-absorbing particles 12 dispersed in a resinous binder. As used herein, the visible spectrum includes wavelengths of about 400 nanometers to 700 nanometers.

When incident visible (white) light I strikes the colorants 8, a portion of the light is absorbed by the colorants 8. The energy of the absorbed light excites electrons in the compounds of the colorants 8 and may be considered to create an increased energy state in the colorants 8. The increased energy state is not stable and is subsequently dissipated as fluorescent light F emitted in all directions from the colorants. The ability of the human eye to perceive the emitted fluorescent light F is dependent on the intensity of the emitted light and the intensity of light reflected from the entire coating.

As shown on the left side of FIG. 1, the incident light I enters the first layer 6 and strikes colorants 8. When the light intensity is low, some portion of the colorants 8 absorbs some energy from the light and achieves an increased energy state. The increased energy state is not stable and the particles ultimately release the energy as emission of low intensity fluorescence in all directions. The incident light passes into the second layer 10 and is absorbed by the light-absorbing particles 12. The coating composition 2 exhibits a color corresponding to the reflection of light not absorbed by colorants 8 and the light-absorbing particles 12. The reflected light may be black or a dark color.

However, as depicted on the right side of FIG. 1, under high light intensity from incident light I, a substantial portion of the colorants 8 absorbs light and achieves an increased energy state that is ultimately emitted in all directions as fluorescent light F. The thicker arrows of incident light I and fluorescent light F on the right side of FIG. 1 are indicative of the increased intensity of incident light I and fluorescent light F. At high intensity of incident light, the emission intensity of the colorants 8 is equal to or greater than the reflectance intensity of the entire coating 2 composition. As a result, the color of the fluorescent light F is detectable by the human eye. The intensity of the fluorescent light F is proportional to the intensity of the incident light I. Hence, the color effect of the present invention is variable with the intensity of the incident light I. For example, as the intensity of incident light increases, more fluorescence becomes perceivable.

Due to the presence of the light-absorbing particles 12, the light-absorbing layer 10 has an inherent color at all intensities of incident light I. The light-absorbing layer 10 may appear black or a dark color such as deep blue, deep green, deep purple, deep red or the like. For any given colorant 8, the emission intensity of the colorant 8 is more likely to be equal to or greater than the reflectance intensity of the entire coating composition 2 for a darker colored light-absorbing layer 10 than for a lighter colored light-absorbing layer 10. The darkness of the light-absorbing layer 10 may be characterized by a color value L* in a conventional color space defined by L*a*b* values. According to convention, the value of a color (L*) represents its lightness and ranges from zero (black) to one hundred (white). The hue of a color is designated by values of a* and b*. The a* value represents redness (positive a*) and greenness (negative a*), and the b* value represents yellowness (positive b*) and blueness (negative b*). Suitable L* value for a light-absorbing layer 10 of the present invention is less than about 40, or less than about 35 or less than about 30.

The concentration of the colorants 8 in the layer 6 is about 0.001 wt. % to about 50 wt. % or about 0.001 wt. % to about 20 wt. %. The lower range of this colorant concentration, e.g., of about 0.001 wt. % to about 0.05 wt. % is particularly suitable for dyes. The concentration of the light-absorbing particles 12 in the layer 10 is about 0.01 wt. % to about 80 wt. % or about 0.1 wt. % to about 50 wt. %.

Figure 2:
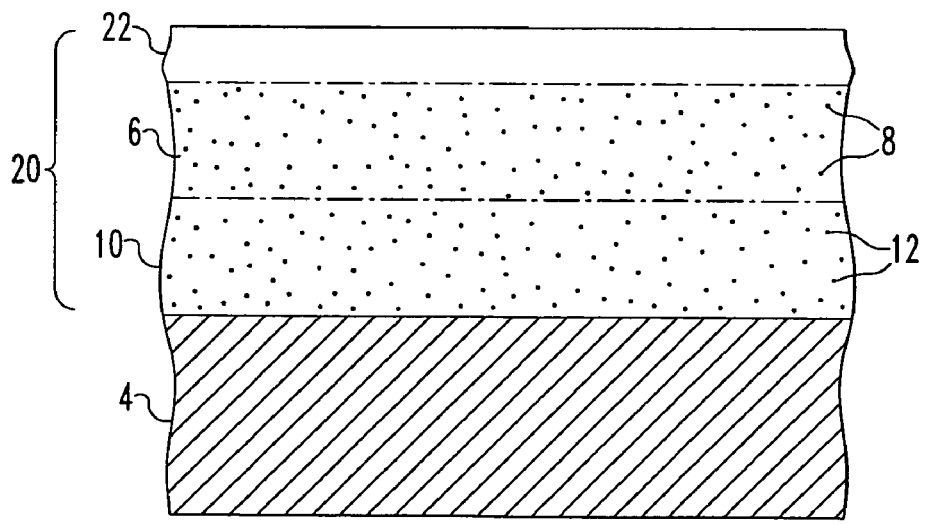
FIG. 2 is another embodiment of a coated substrate of the present invention.

In another embodiment of the invention shown in FIG. 2, a coating 20 including the layers 6 and 10 may include an uncolored polymeric composition as a top layer 22. The top layer 22 provides additional features to the coating 20, such as scratch resistance and the like. The resinous binder which is present in each of layers 6, 10 and 22 may be the same or different from each other.

In use, the color of the coating composition applied to a substrate is dependent on the intensity of the light, such as by the time of day, season of the year, light levels (in shadow or in direct sun) and the like. A color effect may be seen with changes in the intensity of light directed to the coating composition.

The compositions of the fluorescent colorants 8, the light-absorbing particles 12 and the resinous binder are described in turn hereinafter.

Colorants

The colorants 8 of the present invention are preferably pigments or dyes which emit perceivable fluorescent light when exposed to a minimum intensity of visible light.

Suitable materials for the colorants 8 are dyes and pigments. Examples of dyes include acridines, anthraquinones, coumarins, diphenylmethanes, diphenylnaphylmethanes, quinolones, stilbenes and triphenylmethanes.

The pigments may be inorganic or organic. Suitable organic pigments include azo (monoazo, disazo), naphthol, naphthol AS, salt type (lakes), benzimidazolone, condensation, metal complex, isoindolinone, isoindoline and polycyclic (phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, quinophthalone) pigments and mixtures thereof. The size of the pigments is selected so that the pigment particles will not scatter light effectively. Such scattering would induce significant diffuse reflectance that would be observed over a wide range of viewing angles and would mask the fluorescence.

A suitable primary particle size for the pigments is less than about 150 nm, or less than about 70 nm or less than about 30 nm. The primary particles may be non-agglomerated. The dispersed particle size is the size of the individual particles (primary particles) or agglomerates of primary particles. Pigment particles may be prepared by milling bulk colorants, e.g., organic pigments, with milling media having a particle size of less than about 0.5 mm, or less than 0.3 mm or about 0.1 mm or smaller. The pigment particles are milled to nanoparticulate sizes in a high energy mill in an organic solvent system, such as butyl acetate using a dispersant, such as Solsperse® 32,500 available from Avecia, Inc. of Wilmington, Del. or in water using a dispersant, such as Solsperse® 27,000 available from Avecia, Inc. with an optional polymeric grinding resin. Other suitable methods of producing the colorants of the present invention include crystallization, precipitation, gas phase condensation and chemical attrition (i.e., partial dissolution).

Light-Absorbing Particles

The light-absorbing particles 12 of the present invention are pigments which absorb visible light. Suitable light-absorbing pigments include carbon black, and organic pigments such as azo, xanthene, triphenylmethane, anthraquinone (including pyrazolone and perylene), indigold, nitroso, phthalocyanine, quinacridone, methine, oxazine, and azine type pigments, plus inorganic colored complexes, colored oxides and mixed metal oxides, and mixtures thereof. The light-absorbing particles may be sized about 0.01 μm to about 3 μm or about 0.01 μm to about 0.06 μm.

Resinous Binder

The coating composition of the present invention includes a resinous binder. Conventional resinous binders may be used with the colorants described herein in automotive OEM compositions, automotive refinish compositions, industrial coatings, architectural coatings, electrocoatings, powder coatings, coil coatings and aerospace coatings.

Suitable resinous binders include a thermoplastic and thermosetting coating composition having components such as hydroxyl, carboxylic acid, carbamate, amide, or epoxy-containing acrylic copolymers and hydroxyl, carboxylic acid, or carbamate-containing polyester polymers and oligomers, and isocyanate, hydroxyl, or carbamate-containing polyurethane polymers, or amine or isocyanate-containing polyureas which can enhance cure rate, appearance and other physical properties of the cured coating.

The acrylic polymers, if used, are typically copolymers of acrylic acid or methacrylic acid, hydroxyalkyl esters of acrylic or methacrylic acid such as hydroxyethyl methacrylate or hydroxypropyl acrylate, and/or carbamoyloxyethyl methacrylate, acrylamide or glycidyl methacrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl, carboxylic acid, carbamate, amide or epoxy functionality.

Besides acrylic polymers, the curable coating composition of the present invention can contain a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio. Carbamate functionality can be introduced into the polyester by transcarbamylating with a material such as methyl carbinate.

Where it is desired to enhance air-drying, suitable drying oil fatty acids may be used and include those derived from linseed oil, soya bean oil, tall oil, dehydrated castor oil or tung oil.

The polyesters are made to contain free terminal hydroxyl, carbamate and/or carboxyl groups that are available for further crosslinking reactions.

Polyurethane polymers containing terminal isocyanate or hydroxyl groups may also be used. The polyurethane polyols or NCO-terminated polyurethanes that can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat. No. 4,046,729 at col. 5, line 26 to col. 6, line 28, hereby incorporated by reference. Examples of suitable polyols are those described in U.S. Pat. No. 4,046,729 at col. 7, line 52 to col. 10, line 35, hereby incorporated by reference. Examples of suitable polyamines are those described in U.S. Pat. No. 4,046,729 at col. 6, line 61 to col. 7, line 32 and in U.S. Pat. No. 3,799,854 at col. 3, lines 13 to 50, both hereby incorporated by reference.

Suitable curing agents for the curable coating composition include aminoplast resins and phenoplast resins and mixtures thereof, as curing agents for hydroxyl, carboxylic acid, amide and carbamate functional group containing materials. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group containing materials are well known in the art. Examples of polyisocyanates and blocked isocyanates suitable for use as curing agents in the curable compositions of the present invention are those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group containing materials are well known in the art. Examples of anhydrides suitable for use as curing agents in the curable compositions of the present invention are those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COOH functional group containing materials are well known in the art. Examples of polyepoxides suitable for use as curing agents in the curable compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the curable compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides and esters and are well known in the art. Examples of said polyols are those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of polyamines suitable for use as curing agents in the curable compositions of the present invention are those described in U.S. Pat. No. 4,046,729 at col. 6, line 61 to col. 7, line 26, hereby incorporated by reference.

The decorative and protective coating composition may be used as a single coating, as a clear top coating composition, as a base coating in a two-layered system, as layers of a multi-layered system including a clear top coating composition, colorant layer and base coating composition, or as a primer layer.

The invention is further described by reference to the following examples.

EXAMPLES

Examples 1-4 describe the production of coating compositions of the present invention. Examples 5 and 6 describe coated articles using the compositions of Examples 1 and 2, respectively. Examples 7-10 are comparatives.

Example 1

A 4 g solution of Rhodamine 6G (0.2% by weight in methanol, available from Aldrich Chemical Co., Inc., Milwaukee, Wis.) was blended with 63 g of resinous clear coat binder Concept® DCU2042 available from PPG Industries, Pittsburgh, Pa., 18 g isocyanate hardener DCX61 hardener available from PPG Industries, Pittsburgh, Pa. and 15 g of solvent reducer package D870 available from PPG Industries, Pittsburgh, Pa.

Example 2

A 4 g solution of oxazine-4-perchlorate (0.2% by weight in methanol, available from Fisher Scientific, Pittsburgh, Pa.) was blended with 63 g of resinous clear coat binder Concept® DCU2042, 18 g isocyanate hardener DCX61 and 15 g of solvent reducer package D870.

Example 3

A 5 g dispersion of Pigment Yellow 139 was blended with 62 g of resinous clear coat binder Concept® DCU2042, 18 g isocyanate hardener DCX61 and 15 g of solvent reducer package D870.

Example 4

A 5 g dispersion of Pigment Red 254 was blended with 62 g of resinous clear coat binder Concept® DCU2042, 18 g isocyanate hardener DCX61 and 15 g of solvent reducer package D870.

Example 5

The coating composition of Example 1 was spray applied as a tinted clearcoat over a black basecoat. After a 30-minute dry time under ambient conditions, the coated substrate was further sprayed with a two component protective clearcoat containing a blend of resinous clearcoat binder Concept® DCU2042, solvent reducer package D870, and isocyanate hardener DCX61 mixed according to the supplier's recommendations. After a further 60 minutes of dry time, the coated article was baked for 1 hour at 60° C. After the bake period, the coated article was inspected visually. When viewed under low light conditions the article appeared to be black in color. However, when viewed under intense light conditions the color changed to orange.

Example 6

The process of Example 5 was followed except that the composition of Example 2 was used as a tinted clearcoat instead of the composition of Example 1. When viewed under low light conditions the article appeared to be black in color. However, when viewed under intense light conditions the color changed to red.

Comparative Example 7

The process of Example 5 was followed except that a white basecoat was used instead of a black basecoat. When viewed under low light conditions the article appeared to be magenta in color. When viewed under intense light conditions the article remained magenta in color.

Comparative Example 8

The process of Example 6 was followed except that a white basecoat was used instead of a black basecoat. When viewed under low light conditions the article appeared to be blue in color. When viewed under intense light conditions the article remained blue in color.

Comparative Example 9

The process of Example 5 was followed except that the composition of Example 3 was used as a tinted clearcoat instead of the composition of Example 1. When viewed under low light conditions the article appeared to be orange in color. When viewed under intense light conditions the article remained orange in color.

Comparative Example 10

The process of Example 5 was followed except the composition of Example 4 was used as a tinted clearcoat instead of the composition of Example 1. When viewed under low light conditions the article appeared to be red in color. When viewed under intense light conditions the article remained red in color.

Whereas particular embodiments of this invention have been described above for purposes of illustration, it will be evident to those skilled in the art that numerous variations of the details of the present invention may be made without departing from the invention as defined in the appended claims.

We claim:

1. A multi-layer coating applied to a substrate wherein the coating reflects colored light and comprises:
    (a) an upper layer comprising a resinous binder and colorants which emit fluorescent light when exposed to visible light; the colorants being selected from dyes and pigments that will not scatter light that mask fluorescent light; the colorants being present in the upper layer in amounts of 0.001 to 50 weight percent; and
    (b) a lower layer comprising a resinous binder and light-absorbing particles, wherein said coating composition exposed to a first light level exhibits a first colored appearance that is dominated by absorbance of light by both of said colorants and said light-absorbing particles and wherein the coating composition exposed to a second light level of higher intensity than the first light level exhibits a second colored appearance dominated by fluorescent light emitted by said colorants, wherein the lower layer has a color value L* less than 40.

2. The multi-layer coating of claim 1, wherein said dyes are selected from the group consisting of acridines, anthraquinones, coumarins, diphenylmethanes, diphenylnaphthylmethanes, quinolones, stilbenes and triphenylmethanes.

3. The multi-layer coating of claim 1, wherein said pigments are selected from the group consisting of monoazo, disazo, naphthol, naphthol AS, lake, benzimidazolone, metal complex, isoindolinone, isoindoline, phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, and quinophthalone pigments.

4. The multi-layer coating of claim 1, wherein said pigments have a particle size of 100 nanometers or less.

5. The multi-layer coating of claim 1, wherein said resinous binder in the upper and/or lower layers comprises a curable polymer composition.

6. The multi-layer coating of claim 1, wherein the concentration of said light-absorbing particles in said lower layer is about 0.001 wt. %-80 wt. %.

7. The multi-layer coating of claim 1, further comprising a third layer overlying said upper layer, said third layer comprising an uncolored polymer composition.

8. A method of creating a color effect in a coating comprising the steps of:
providing the multi-layer coating of claim 1;
illuminating the coating composition with light having a first intensity of light, such that the coating composition exhibits a first colored appearance dominated by absorbance of light by the colorants and the light-absorbing particles; and
illuminating the coating composition with light having a second intensity which is greater than the first light intensity, such that the coating composition exhibits a second colored appearance dominated by fluorescent light emitted by the colorants.

9. The method of claim 8, wherein the dyes are selected from the group consisting of acridines, anthraquinones, coumarins, diphenylmethanes, diphenylnaphthylmethanes, quinolones, stilbenes and triphenylmethanes.

10. The method of claim 8, wherein the pigments are selected from the group consisting of monoazo, disazo, naphthol, naphthol AS, lake, benzimidazolone, metal complex, isoindolinone, isoindoline, phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, and quinophthalone pigments.

* * * * *